United States Patent Office 2,954,295
Patented Sept. 27, 1960

2,954,295

PROCESS FOR PREPARING PUFFED CEREAL PRODUCT

Adolph S. Clausi and Raymond E. Mohlie, Battle Creek, Mich., assignors to General Foods Corporation, White Plains, N.Y., a corporation of Delaware No Drawing. Filed Feb. 11, 1959, Ser. No. 792,483

7 Claims. (Cl. 99—82)

The present invention relates to puffed cereal products of the ready-to-eat breakfast cereal type. This application is a continuation-in-part of U.S. patent applications Serial No. 452,464, filed August 26, 1954, and now abandoned; and Serial No. 652,668, filed April 15, 1957, now abandoned.

It has been found that a gun-puffed breakfast cereal product of greatly enlarged size may be prepared by subjecting uncooked dough or dough pieces to gun-puffing providing the uncooked dough or dough pieces are dried to a moisture content below about 16% by the application of heat before they are gun-puffed. This application of heat must be such that when the starch granules in the dough are viewed microscopically under polarized light a substantial loss of Maltese crosses occurs in the starch granules, but the starch granules in the dried dough or dough pieces retain their shape and a majority of the starch granules are unruptured. However, a minority of the starch granules do rupture providing some gelatinization of the dough pieces in the dryer. In general, this heat treatment of the dough or dough pieces before gun-puffing requires the application of heat at temperatures between 250°–400° F., the duration of such heat treatment being dependent upon the type of farinaceous material in the dough, the moisture content of the dough and the shape and size of the dough piece. At temperatures in excess of 250° F. the time and temperature are correlated so that the moisture limits are not exceeded, the dough piece does not scorch, the dough piece being at a moisture content above about 3% or at a moisture content at least high enough to permit gun-puffing to produce a product shape several times the original size of the dough piece.

Of particular interest to the present invention is the discovery that the shape and other features of the dried dough shapes or other features of the original material, i.e., the unpuffed article, is reproduced in gun-puffing with extreme faithfulness. This is of particular interest in connection with gun-puffing dough pieces which have been cut into the form of the letters of the alphabet or numerals. It has particular advantage since the production of alphabet or numerical shapes is done with mass production techniques and in a very economical manner. Also, it permits one to control with a great degree of success the appearance of the final puffed product, something which has heretofore been quite impossible in the art of producing a desirable ready-to-eat breakfast cereal product when employing particularly weak non-glutenous doughs of rice, corn, oats, and the like. In addition, the degree of puffing obtained is quite satisfactory, the size of the puffed product being of the order of 5–6 times the size of the original material. The elimination of any prolonged cooking step such as has been required heretofore in the ready-to-eat breakfast cereal art results in considerable economy for previously care had to be employed to provide for uniformity of gelatinization in the course of cooking and heating the dough for a fairly long period of time to effect cooking. Furthermore, cooked starch is considerably more difficult to dry than uncooked starch even though both are in the form of a dough having about the same moisture content. Also, it was previously impossible to provide a faithful reproduction of the original shape of the dough piece on gun-puffing, particularly where intricate shapes were desired which called for a high degree of definition of corners, perforations, etc.

More specifically, in the case of pellets formed from cooked dough, shaped and gun-puffed, where a particular shape is desired, the processes of the prior art are applicable to only simpler, more rounded shapes, such as O shapes; even then the puffed product varies in its degree of puff and shape-definition. A cooked dough is exceedingly difficult to shape into intricate designs having corners, perforations or striations. After shaping, which usually involves extrusion through a die, it becomes necessary to dry the pellets of cooked dough from fairly high moisture levels to a moisture content suitable for effective gun-puffing. After formation of the pellets and during this drying step, the pellets tend to lose their original shape and round out on their surfaces due to evaporation of moisture and the plastic nature of the cooked dough. Upon subsequent gun-puffing, these puffed dough pellets demonstrate further loss of most of the detail of the original shape.

On the other hand, in the case of gun-puffing an uncooked dough which is formed into pellets, although accuracy of shape-definition in most instances appears to be obtainable, the product generally tends to be gummy or mushy and thus suffers from a lack of crispness when added to milk or cream or breakfast cereal juice. This is particularly the case where the weak non-glutenous doughs of rice, corn and oats are employed which do not have adequate physical strength to resist crumbling prior to gun-puffing and shattering during gun-puffing. Accordingly, it appears that the shapes of uncooked dough must not only be dried to a moisture content below 16% and above about 3% at which they will puff successfully, but must also be modified in the structure of their starch granules by the application of heat such that the dough shapes will develop an adequate glutenous character allowing them to be handled in gun-puffing without a loss of yield and without the results of an unfavorable tendency to become mushy when the puffed product is added to milk or cream. Although some rupture of a minor percentage of the starch granules in the uncooked dough may take place in the process of heat treatment of the dough shapes in order to develop the aforementioned glutenous character, the major portion of the starch granules are unruptured and the starch granules themselves are modified in their crystalline structure to the extent that a majority of the Maltese crosses typifying unmodified starch granules disappears. The heat treatment required in drying the dough shapes to a moisture content below 16% and above about 3% should be between 250°–400° F. and preferably a pellet drying temperature of 300°–350° F. is employed.

In carrying out the process of the present invention any conventional cereal flour or cereal starch such as those of wheat (hard or soft), corn, rice, tapioca, arrowroot, potato, oat, barley, rye, etc. may be employed. Any other farinaceous material from which a dough may be prepared may also be employed. Also, mixtures of such flours or starches may be employed and in many cases with particular advantage from the standpoint of the degree of puffing.

The first step in the process preferably comprises the combination of the water or other aqueous liquid with the uncooked farinaceous material such as flour, or starch, the distribution of the water throughout the farinaceous material being effected by simple stirring or other mixing usually for a period of about 5 minutes in order to get sufficient elasticity and dough-like consistency needed for subsequent shaping and puffing. In this connection, the amount of moisture needed in the dough is generally in the order of 20–50%. The amount of moisture present in the dough will vary for various farinaceous materials, the only criteria being one of sufficient moisture to obtain the desired elastic dough mass capable of being extruded and thereby shaped into dough pieces. After this initial mixing step, the materials must then be kneaded to affect thorough homogeneity. In certain dough shaping equipment, kneading occurs during the extruding operation whereas in others it may be required to separately knead the mass for a sufficient period of time in the order of 5–10 minutes. Commercial equipment permitting simultaneous mixing of aqueous liquids with farinaceous material and kneading is illustrated by the Baker-Perkins mixer or any other of the kneading devices employed in commercial bakeries, macaroni factories, etc. An illustration of the type of kneader employed in the macaroni industry is shown in "Macaroni Product," Le Clerc, Cereal Chemistry, vol. 10, pages 383–419 (1933).

The dough is then shaped to whatever form is desired. This may be the tubular macaroni shape, the shell macaroni shape or, more preferred, the materials may be formed into various letters of the alphabet or into numerals. The equipment for this purpose is also shown in the aforementioned article by Le Clerc. In this latter connection, a die having a cross section of the desired shape is employed in conjunction with a knife which cuts off the form as it emerges and in this manner forms a letter, number or other shape.

As indicated above, particular care in the formation of the shape of the unpuffed dough pieces is amply justified because the method of the present invention provides a faithful reproduction on puffing of whatever shape the unpuffed dough is formed into.

After forming the dough, drying to below 16% and above about 3% moisture should be accomplished prior to puffing. This may be carried out in any conventional manner by using a forced draft dryer which is preferred from the standpoint of greater efficiency of drying, a temperature of 300°–350° F. being preferred and a period of about 2–10 minutes being employed to effect the desired treatment of the starch granules so that the majority of the characteristic Maltese crosses disappear. As indicated above, a majority of the starch granules will be unruptured and a minority of the starch granules will be gelatinized to the point of rupture. Other conditions of drying may be required depending upon the drying equipment, the nature of the uncooked farinaceous material employed and the dimensions and shapes of the dough pieces formed. Also, it might be desirable in some cases to prepare a dough containing greater amounts of moisture than those indicated above, which of course would require a longer drying period.

Drying should be carried to a point where the moisture content of the dough pieces is within the range of about 6–16%. Below 3%, there is usually insufficient moisture to provide the desired degree of puffing. However, some degree of puffing would be obtained at such low moisture levels, i.e., below 3%, but this is not preferred in making a low density puffed breakfast cereal product. On the other hand, above 16% moisture excessive clustering or clumping will be experienced in the puffing gun because of the stickiness of the pieces. Moreover, the highest degree of puffing and faithful reproduction of shapes is not obtained at higher moisture contents.

Drying conditions based on experience in employing the aforementioned forced air dryer have shown the following time-temperature relationships for drying dough shapes of most cereal flours from 30–40% moisture down to 8–12% moisture:

5–10 minutes at 250° F.
2–6 minutes at 300° F.
1–3 minutes at 400° F.

It has been found that a pellet drying temperature of 300–350° F., the temperature of the air circulated through the bed of the dryer, is preferred for giving the ultimate properties of the gun-puffing product. At pellet drying temperatures above 400° F. an undue amount of surface browning occurs which results in scorching accompanied by an unfavorable, burned cereal character. Below 250° F. the gun-puffed product approaches the undesirable gummy and mushy characteristics; and the dried dough shapes are not resistant to crumbling prior to gun-puffing and are inclined to shatter when subjected to the drastic pressure differential incident to gun-puffing, especially in the case of doughs which naturally have a non-glutenous character such as those obtained from rice, corn and oats.

As an indication of the degree of starch modification which is practiced in drying the dough shapes to the aforesaid moisture content, a raw hard wheat flour dough containing 30% moisture was extruded into O shaped pellets about ¼″ outer diameter and ⅟₁₆″ thick. Specimens of starch granules were selected from various dried doughs of the wheat flour and dispersed at equal weights in water and the Maltese crosses were examined microscopically under polarized light. About 95% of the starch granules contained in the dough of raw wheat flour exhibited the Maltese cross. Likewise, a wheat flour dough pellet which was dried to about 10% moisture at about 75° F. also exhibited about 95% Maltese crosses. On the other hand, where the same dough pellets were dried to 10% moisture using the aforementioned forced draft dryer at a circulating air temperature of 300° F. for about 3 minutes, only 10% of the starch granules exhibited the Maltese crosses. Although most of the Maltese crosses disappeared at the 300° F. drying temperature, the starch granules appeared whole with little or no evidence of rupturing. The wheat flour dough pellets which were dried at the aforementioned temperature of 300° F. puffed successfully into a ready-to-eat breakfast cereal having the desired crispy character. On the other hand, in the case of wheat flour dough pellets dried to 10% moisture at 75° F., the gun-puffed product had an undesirable gummy texture when eaten as a breakfast cereal with milk.

The dried dough pieces are placed into a gun-puffing apparatus of any suitable type such as batch gun-puffer of the barrel type. Preferably, the shaped pieces are held in the gun for a period of time to result in equalization of moisture content throughout the mass. This may be done by preheating the pieces for four minutes by applying an open gas flame to the outside of the barrel which provides a temperature of about 400° F. within the gun. In any event, the pieces should be elevated to a sufficient temperature where, upon subsequent introduction of super-heated steam into the gun-puffing chamber, steam will not be condensed and thereafter impair gun-puffing efficiency. Preferably, the dry dough shapes prior to introduction of steam into the puffing chamber should have a temperature above 250° F. and ranging from that temperature to about 300° F. Above this latter temperature scorching will be encountered. Thereafter, super-heated steam of about 150–175 lbs./per sq. in. (gauge) to effect expansion of the dough shapes. Super-heated steam is generally introduced into the chamber at a temperature of 375°–450° F. The holding time in the puffing gun will vary with the degree of expansion desired. Where gun-puffing by sudden release to atmospheric pressure is employed, the holding time in the chamber will vary from 20–45 seconds to obtain a breakfast cereal type of product.

After puffing, the expanded product usually contains about 2–6% moisture and generally it will be found that it should be dried further to 1–2% moisture from the standpoint of maximum palatability and appeal. Also, the product is usually toasted, which can be most conveniently effected in the drying operation.

A detailed example of the process of the present invention is set forth below:

25 pounds of hard wheat flour is admixed with 9 pounds of water in a Baker-Perkins mixer for a period of about 10 minutes to accomplish mixing and kneading. This provides a dough containing somewhat over 30% moisture. This dough is then extruded or otherwise formed into any desired shape. It is formed into the shape of an X by extruding it through a die having an X cross section, cutting off the extrudate with revolving knife blades as it emerges to provide the shapes. A small amount of starch or flour may be sprinkled on the Xs to prevent sticking and provide greater ease of handling. The shapes are then placed on a foraminous conveyor and dried in a forced draft dryer at 250° F. using an air velocity of about 300 linear feet per minute, down draft, for 10 minutes, the bed thickness being about ½ inch. After drying the shapes are at a moisture content of about 10%. They may then be charged to a gun-puffing apparatus but it is preferred that a tempering step of about 4–5 hours be employed.

A puffing gun comprising a cylinder about 9 inches in diameter and 24 inches long is charged with about 5 pounds of the aforementioned dried shapes. The gun is then closed and the cylinder is revolved about its longitudinal axis while heating with an open gas flame along the length of said axis. This is continued for about 4 minutes during which time the temperature within the gun reaches about 400° F. Generally, the temperature of 400° F. is obtained shortly after the charge is placed in the gun so that during the greater part of the time the charge is subjected to this high temperature. After the aforementioned period of 4 minutes steam is introduced, the pressure of the steam being about 159–175 lbs./sq. in. (gauge), which pressure is almost instantaneously obtained within the gun upon the introduction of the steam. After holding the material at this elevated pressure for about 45 seconds the steam valve is shut and the gun is fired in the conventional manner releasing the pressure instantaneously and effecting gun-puffing.

The moisture content of the puffed product is about 5% so that further drying is employed to reduce the moisture content to about 2%. This is accomplished by using the forced draft dryer mentioned above at the same temperature and air velocity for about 10 minutes. If toasting is desired the drying and toasting may be effected simultaneously using said forced draft dryer at higher temperatures or open gas flames at 500°–600° F. This requires a period of time of about 2–3 minutes.

Although one specific gun-puffing operation has been described in detail in the specific example given, gun-puffing may be achieved by other means than that by puffing to atmospheric pressure; thus a dough piece may be puffed by releasing shaped dough pieces from a puffing chamber to a sub-atmospheric pressure. Where it is desired to gun-puff by sudden release to sub-atmospheric pressure approximately the same technique may be employed as in puffing to atmosphere except that steam pressure in the gun is usually much lower. For example, in puffing to sub-atmospheric pressure a pressure in the puffing chamber of 80 p.s.i.g. to 90 p.s.i.g. normally results in about the same degree of product expansion as when a pressure of 175 p.s.i.g. is used in puffing to atmosphere.

Likewise, it is contemplated as being within the scope of the present invention to incorporate flavoring materials, sugar, salt, malt, vanilla, and the like, at any stage in the process, such as when the dough is being kneaded or after the product has been puffed and dried. Also, the product may be colored. The preferred way to color the product is by incorporating the dye while the dough is being mixed or kneaded or by spraying a solution of dye onto the shapes before puffing, or if desired, after puffing and before the final drying period. Also, a candy coating may be applied using any well known technique of applying a hard candy such as that shown in U.S. Patent No. 2,333,442, or by the application of a syrup as is shown in U.S. Patent No. 2,196,304.

While the present invention has been described with particular reference to a specific example, it is not to be limited thereby, but reference is to be had to the appended claims for a definition of its scope.

What is claimed is:

1. A process for preparing a puffed, ready-to-eat breakfast cereal product comprising preparing an uncooked kneaded cereal dough, forming said dough into relatively smal shapes, drying said shapes to a moisture content of 3% and at least high enough to permit gun-puffing to produce a product shape several times its original size, but to below 16% by the application of heat at temperatures in excess of 250° F. but below 400° F., the time and temperature of drying being correlated so that when viewed microscopically under polarized light a substantial loss of Maltese crosses occurs in the starch granules but the starch granules retain their shape and are unruptured, charging said dried dough shapes to a gun-puffing zone and gun-puffing said shapes to provide a product several times larger than the original shape while being a faithful reproduction of said original shape, said dough shapes being gun-puffed by subjecting them while at a temperature above that at which steam condenses thereon to super-atmospheric temperatures and pressures for a period sufficient to develop positive steam pressure to puff said dough shapes upon their release to an unconfined area of low pressure, and thereafter discharging said shapes to said unconfined area of low pressure.

2. The process of claim 1 in which the uncooked dough is formed by the addition of sufficient aqueous liquid so that said dough has a moisture content within the range of about 20–50%.

3. The process of claim 2 in which the uncooked dough shapes are dried by the application of heat at a temperature between 250°–400° F. to produce a dough shape having a temperature of 250°–300° F.

4. The process of claim 3 in which the gun-puffing operation involves introducing super-heated steam to the gun-puffing apparatus at a pressure of about 150–175 lbs./sq. in. (gauge) and thereafter discharging the dough shapes to normal atmospheric condition.

5. The process of claim 1 in which the cereal employed is corn.

6. The process of claim 1 in which the cereal employed is rice.

7. The process of claim 1 in which the cereal employed is oat.

References Cited in the file of this patent

UNITED STATES PATENTS

| | | |
|---|---|---|
| 874,279 | Anderson | Dec. 17, 1907 |
| 2,162,376 | Collatz | June 13, 1939 |
| 2,264,574 | Kellogg | Dec. 2, 1941 |
| 2,292,274 | Kellogg | Aug. 4, 1942 |

FOREIGN PATENTS

| | | |
|---|---|---|
| 26,792 | Australia | May 19, 1930 |